(12) United States Patent
Rivera

(10) Patent No.: US 11,733,083 B2
(45) Date of Patent: *Aug. 22, 2023

(54) ADJUSTABLE SCOOPING DEVICE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 17/146,329

(22) Filed: Jan. 11, 2021

(65) Prior Publication Data

US 2021/0255018 A1 Aug. 19, 2021

Related U.S. Application Data

(63) Continuation of application No. 16/687,409, filed on Nov. 18, 2019, now Pat. No. 10,908,009, which is a continuation-in-part of application No. 15/702,695, filed on Sep. 12, 2017, now Pat. No. 10,584,993.

(51) Int. Cl.
*G01F 19/00* (2006.01)

(52) U.S. Cl.
CPC .................................. *G01F 19/002* (2013.01)

(58) Field of Classification Search
CPC ...................................................... G01F 19/002
See application file for complete search history.

(56) References Cited

U.S. PATENT DOCUMENTS

| | | |
|---|---|---|
| 1,708,456 A | 4/1929 | Tunick |
| 2,034,733 A | 3/1936 | Wilkins |
| 2,259,504 A | 10/1941 | Wilson |
| 2,630,014 A | 3/1953 | Chester |
| 3,049,926 A * | 8/1962 | Victor .................. G01F 19/002 30/326 |
| 3,603,358 A | 9/1971 | Mallindine |
| 4,788,862 A | 12/1988 | Fuller |
| 5,884,523 A | 3/1999 | Cheng et al. |
| 6,035,907 A | 3/2000 | DeCoster |
| 6,101,335 A | 8/2000 | Onda |
| 6,481,338 B1 | 11/2002 | Wai |
| 6,974,056 B2 | 12/2005 | Rea |
| D554,449 S | 11/2007 | Stewart |

(Continued)

FOREIGN PATENT DOCUMENTS

| | | |
|---|---|---|
| DE | 02017117727 A1 | 2/2019 |
| EP | 1576912 A2 | 9/2005 |

(Continued)

*Primary Examiner* — Clayton E. LaBalle
*Assistant Examiner* — Diana Hancock
(74) *Attorney, Agent, or Firm* — IP Strategies

(57) ABSTRACT

An adjustable scoop includes a scoop body and a plunger. The scoop body has a cylindrical interior sidewall, a hollow interior, an open top, and an open bottom. The plunger is arranged in the interior of the scoop body such that a top surface of the plunger faces the open top. A volume of the interior of the scoop body above the plunger defines a volume of the adjustable scoop. The plunger is rotatable in the interior of the scoop body to adjust the volume of the adjustable scoop. The plunger includes a first engagement element, and a surface of the interior sidewall of the scoop body includes a second engagement element extending from the surface. The first and second engagement elements mutually cooperate to translate rotation of the plunger to adjustment of the volume of the adjustable scoop.

20 Claims, 3 Drawing Sheets

(56) References Cited

U.S. PATENT DOCUMENTS

| | | |
|---|---|---|
| 7,441,676 B2 | 10/2008 | Pickering, Jr. |
| 9,055,844 B2 * | 6/2015 | Schuelke |
| 10,584,993 B2 * | 3/2020 | Rivera ................. G01F 19/002 |
| 10,908,009 B2 * | 2/2021 | Rivera ................. G01F 19/002 |
| 2005/0017028 A1 | 1/2005 | Rea |
| 2005/0173467 A1 | 8/2005 | Pickering, Jr. |
| 2008/0142228 A1 | 6/2008 | Harvey et al. |
| 2009/0056440 A1 | 3/2009 | Vendl et al. |
| 2009/0107581 A1 | 4/2009 | Sayage |
| 2011/0005398 A1 | 1/2011 | Garcia et al. |
| 2011/0162533 A1 | 7/2011 | Fumagalli |
| 2012/0248138 A1 | 10/2012 | Wollach |
| 2014/0083555 A1 | 3/2014 | Allen |
| 2015/0069092 A1 | 3/2015 | Schuelke |
| 2015/0177594 A1 | 6/2015 | Weber |
| 2016/0157661 A1 | 6/2016 | Torquemada |
| 2016/0256012 A1 | 9/2016 | Rivera |
| 2016/0257548 A1 * | 9/2016 | Rivera .................... B67C 11/02 |

FOREIGN PATENT DOCUMENTS

| | | |
|---|---|---|
| FR | 2895660 A1 | 7/2007 |
| FR | 2900810 A1 | 11/2007 |
| WO | 2012080814 A1 | 6/2012 |

\* cited by examiner

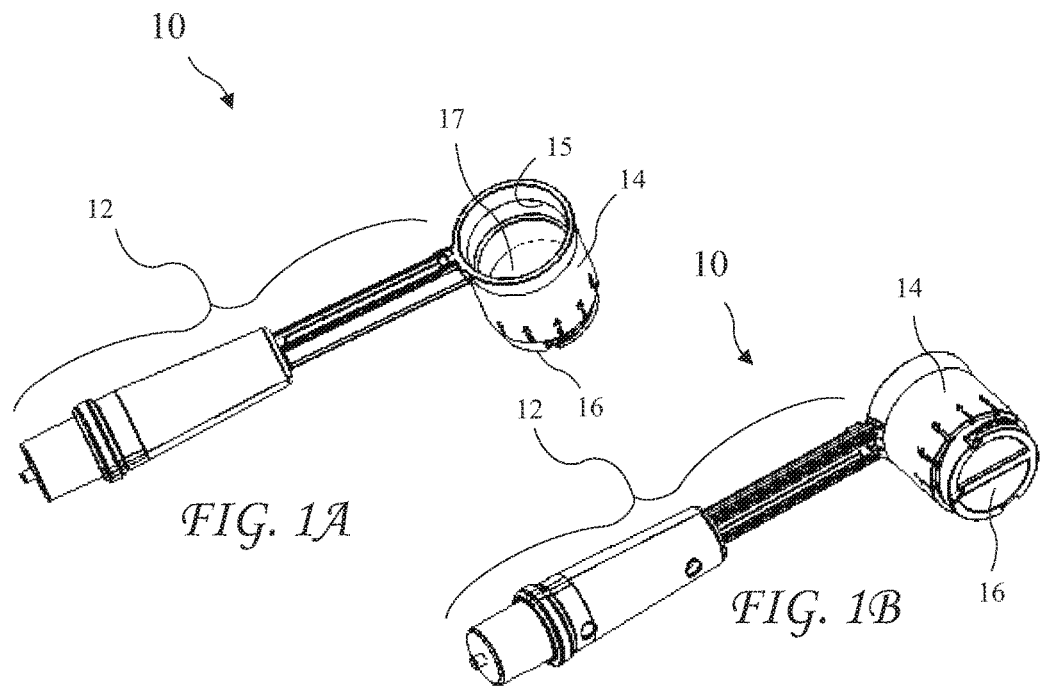
FIG. 1A
FIG. 1B
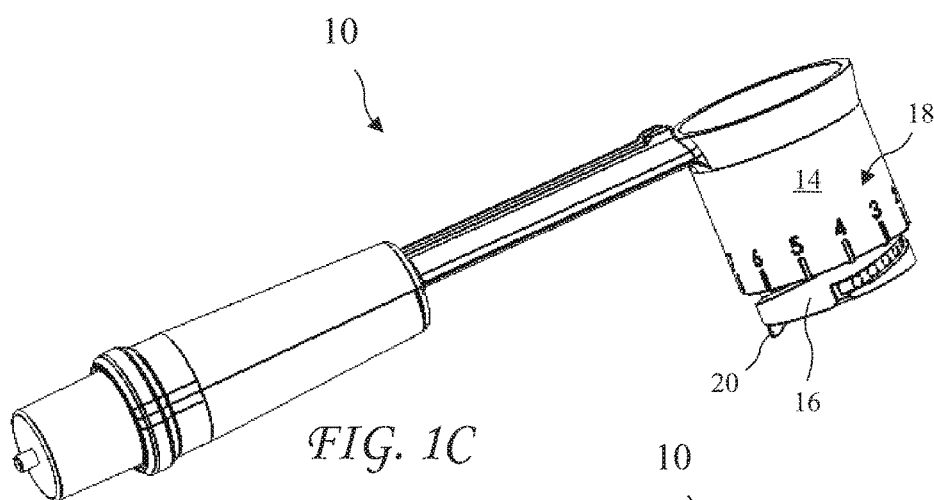
FIG. 1C
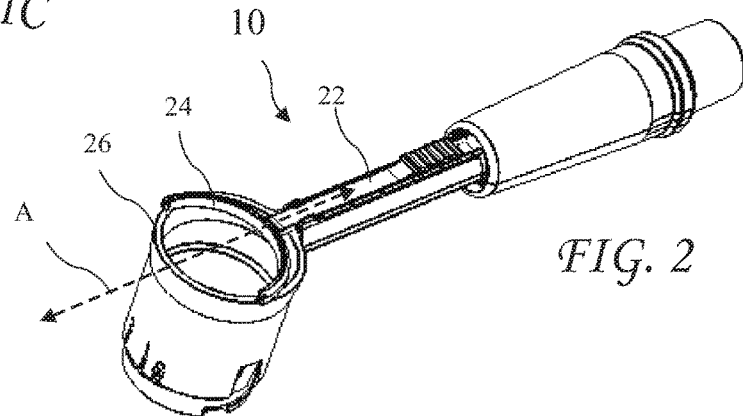
FIG. 2

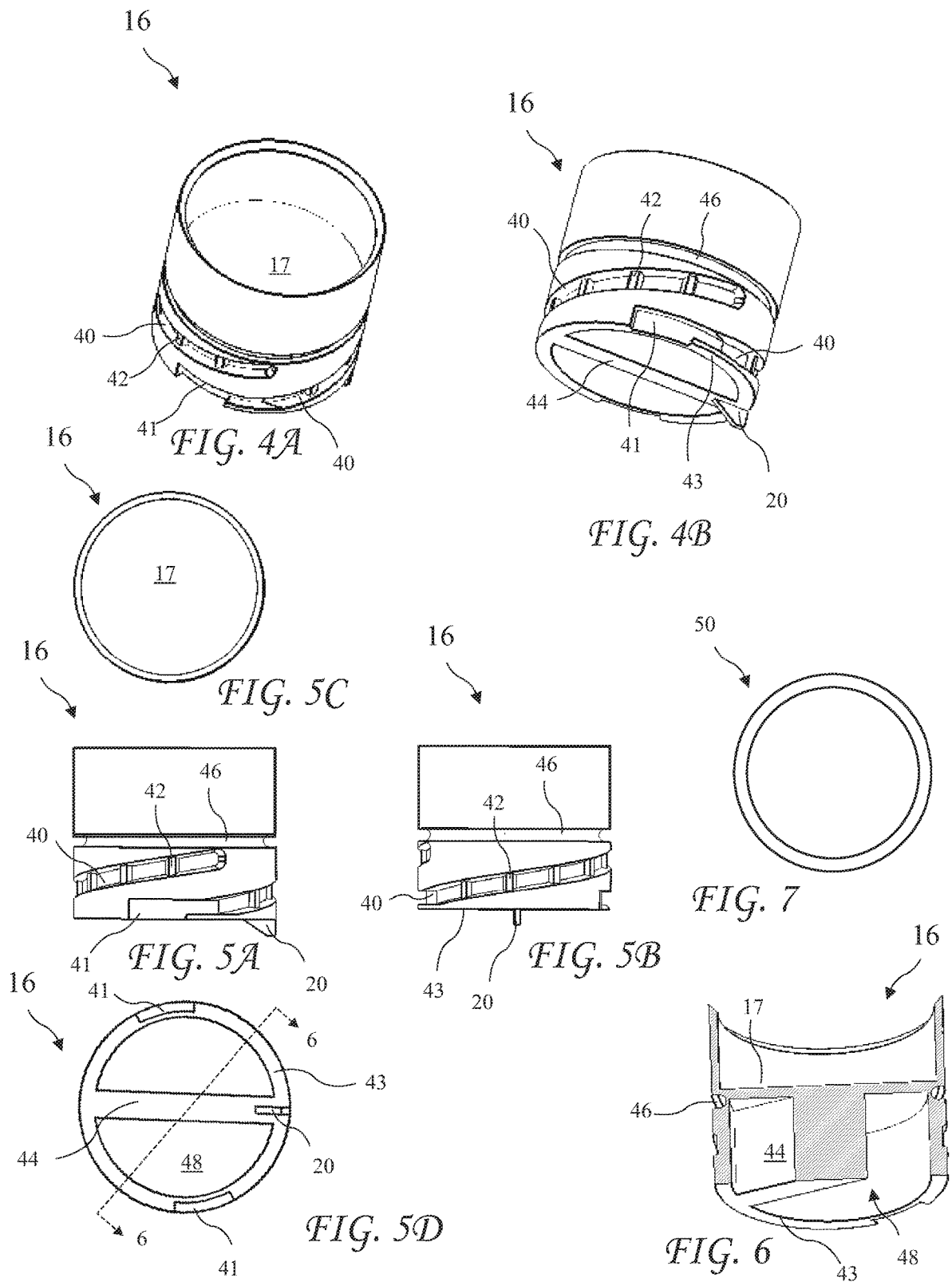

ADJUSTABLE SCOOPING DEVICE

CROSS-REFERENCE TO RELATED APPLICATION

This is a continuation of co-pending U.S. patent application Ser. No. 16/687,409, which was filed on Nov. 18, 2019, which in turn is a continuation-in-part of U.S. patent application Ser. No. 15/702,695, which was filed on Sep. 12, 2017, the entire disclosures of which are incorporated herein by this reference.

FIELD OF THE INVENTION

The invention relates to scoops used to measure a volume of pourable substances.

BACKGROUND OF THE INVENTION

Cooks and bakers use various volumes of different materials when preparing food and drinks. Measuring out these volumes typically requires a number of scooping implements to measure the various different volumes. As a result, any cooking process typically requires providing, using, and cleaning a number of different measuring scoops.

There are other examples of applications in which more than one measuring scoop is required due to different volumes needing to be measured. For example, brewed beverages are often prepared from measured amounts of brewing material, scooped from a bulk amount of the brewing material. However, the amount of material to be measured can vary based on the desired strength of the resulting beverage and the number of servings of beverage to be brewed. Often several people share the same brewing machine and might have different preferences as to strength and volume, necessitating the use of several scoops having different volumes. A large scoop having markings for measuring various fractions of the entire scoop amount allows a single scoop to be used to measure different amounts, but requires careful scooping, or pouring of the material into the scoop, to avoid under- or over-measuring, and is overall not as simple and quick to use as a simple scoop. Further, estimating a fractional amount in a large scoop results in more variance in the measurement process than does a full scoop that can be leveled to provide a consistent volume with every use.

It would be beneficial in these and other cases to be able to scoop different measured amounts of material without having to provide, use, and clean several scoops. A single scoop having an adjustable volume would be advantageous in this respect.

BRIEF SUMMARY OF THE INVENTION

The invention addresses the above and other needs by providing an adjustable scoop that can be used to provide different, selectable volumes of material from the same leveled scoop.

According to an aspect of the invention, an adjustable scoop includes a scoop body and a plunger. The scoop body has a cylindrical interior sidewall, a hollow interior, an open top, and an open bottom. The plunger is configured to be arranged in the hollow interior of the scoop body such that a top surface of the plunger faces the open top of the scoop body. A volume of the hollow interior of the scoop body above the top surface of the plunger defines a volume of the adjustable scoop. The plunger is rotatable in the hollow interior of the scoop body to adjust a distance between the top surface of the plunger and the open top of the scoop body, thereby adjusting the volume of the adjustable scoop. The plunger includes a first engagement element, and a surface of the interior sidewall of the scoop body includes a second engagement element extending from the surface of the interior sidewall. The first and second engagement elements are configured to mutually cooperate to translate rotation of the plunger in the hollow interior of the scoop body to adjustment of the distance between the top surface of the plunger and the open top of the scoop body. The surface of the interior sidewall of the scoop body is smooth and continuous with the exception of the second engagement element.

The adjustable scoop can also include a handle having a grasping end and a scoop end. The scoop body is attached to the scoop end of the handle. The adjustable scoop can also include a leveling element. The leveling element includes a leveling arm that is slidably coupled to the handle, and a leveling bar slidable across the open top of the scoop body.

The plunger can include a grip that is graspable to rotate the plunger in the scoop body.

The plunger can be cylindrical, having an outer wall corresponding to the cylindrical interior sidewall of the scoop body. The outer wall of the plunger can include an annular groove. The first engagement element can be, for example, a spiral groove formed in the outer wall of the plunger, and the second engagement element can include a flap formed at the open bottom of the scoop body, and a bump formed on the flap. The plunger can also include a plurality of teeth arranged in the spiral groove and raised to an extent so as to provide resistance to movement of the bump over the teeth, and the flap provides sufficient flexibility to allow movement of the bump over the teeth. The scoop body can include a plurality of index lines marked at spaced intervals, and the plunger can include a pointer that aligns generally with a selected one of the index lines as the plunger is rotated in the hollow interior of the scoop body. Locations of the index lines can correspond to locations of the teeth. The spiral groove can terminate at one end at a bottom edge of the plunger.

The first engagement element can be multiple spiral grooves, such as first and second spiral grooves formed in the outer wall of the plunger. In this case, the second engagement element can include a flap formed at the open bottom of the scoop body, a bump formed on the flap, and a tab extending from the interior sidewall of the scoop body. The flap can be arranged, for example, opposite the tab. The bump can be configured to engage the first spiral groove, and the tab can be configured to engage the second spiral groove. The plunger can also include a plurality of teeth arranged in the spiral groove and raised to an extent so as to provide resistance to movement of the bump over the teeth, the flap can provide sufficient flexibility to allow movement of the bump over the teeth, and the tab can extend from the interior sidewall of the scoop body an insufficient distance to contact the teeth. The first and second spiral grooves can terminate at one end at a bottom edge of the plunger.

The scoop body can include a plurality of index lines marked at spaced intervals, and the plunger can include a pointer that aligns generally with a selected one of the index lines as the plunger is rotated in the hollow interior of the scoop body. The locations of the index lines can correspond to locations of features of the first engagement element.

BRIEF DESCRIPTION OF THE DRAWINGS

FIG. 1A shows an isometric view of an exemplary adjustable scooping device according to the invention.

FIG. 1B shows another isometric view of an exemplary adjustable scooping device according to the invention.

FIG. 1C shows another isometric view of an exemplary adjustable scooping device according to the invention.

FIG. 2 shows another isometric view of an exemplary adjustable scooping device according to the invention, including a level.

FIG. 4A shows an isometric view of an exemplary plunger according to the invention.

FIG. 4B shows another isometric view of an exemplary plunger according to the invention.

FIG. 5A shows a side view of an exemplary plunger according to the invention.

FIG. 5B shows another side view of an exemplary plunger according to the invention.

FIG. 5C shows a top view of an exemplary plunger according to the invention.

FIG. 5D shows a bottom view of an exemplary plunger according to the invention.

FIG. 6 shows a cross-sectional view of an exemplary plunger according to the invention, taken along line 6-6 of FIG. 5D.

FIG. 7 shows an exemplary O-ring according to the invention.

Corresponding reference characters indicate corresponding components throughout the several views of the drawings.

DETAILED DESCRIPTION OF THE INVENTION

Figure 3A:
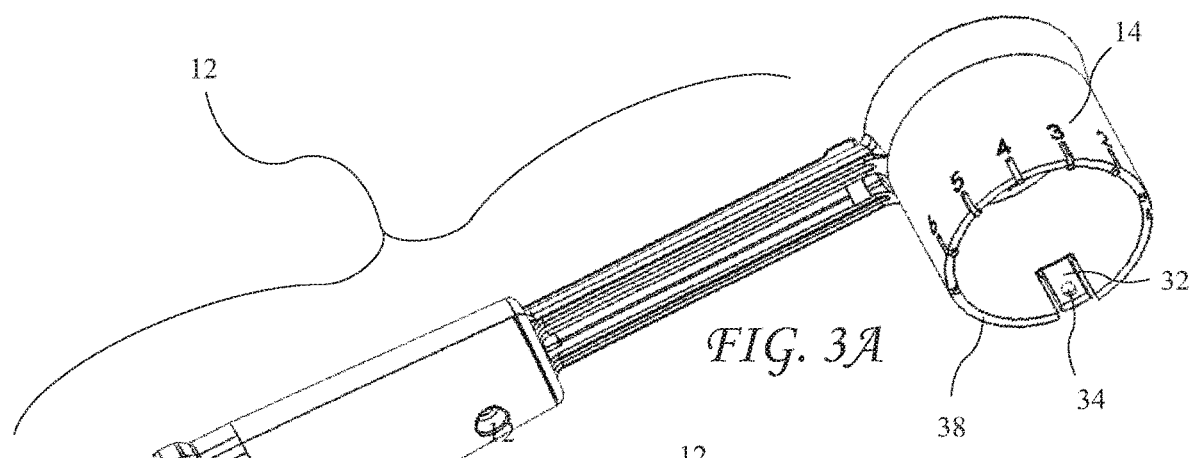
FIG. 3A shows an isometric view of an exemplary handle and scoop according to the invention.

With reference to FIGS. 1A-C, an adjustable scooping device 10 includes a handle 12 and a scoop, which includes a scoop body 14 attached or integrally formed at one end of the handle 12. As shown, the scoop body 14 has a cylindrical interior 15, The scoop also includes a cylindrical plunger 16 that is movable inside the cylindrical interior 15 of the scoop body 14 to raise and lower a floor 17 of the scoop to adjust the volume of the scoop. A pointer 20 on the plunger 16 is movable to align with index lines 18 on the scoop body 14 as the plunger 16 is adjusted to indicate the volume of the scoop as the volume is adjusted. Although the scoop body 14 as shown is cylindrical with a round interior cross-section, the scoop body 14 can have any internal cross-sectional shape, as can the plunger 16. For advantageous operation, the sidewalls of the interior of the scoop body 14 should be mutually parallel, and should closely correspond to the periphery of the plunger 16.

The adjustable scooping device 10 can also include a leveling arm 22, as shown in FIG. 2. As the leveling arm 22 slides along the handle 12 in the direction of the arrow A, a leveling bar 24 slides across a scoop mouth 26 of the scoop body 14 to level material in the scoop. The leveling arm 22 and leveling bar 24 allow for a consistent measure of the material in the scoop by providing a mechanism for removing a heaped quantity of the material before dispensing the leveled amount remaining in the scoop.

Figure 3B:
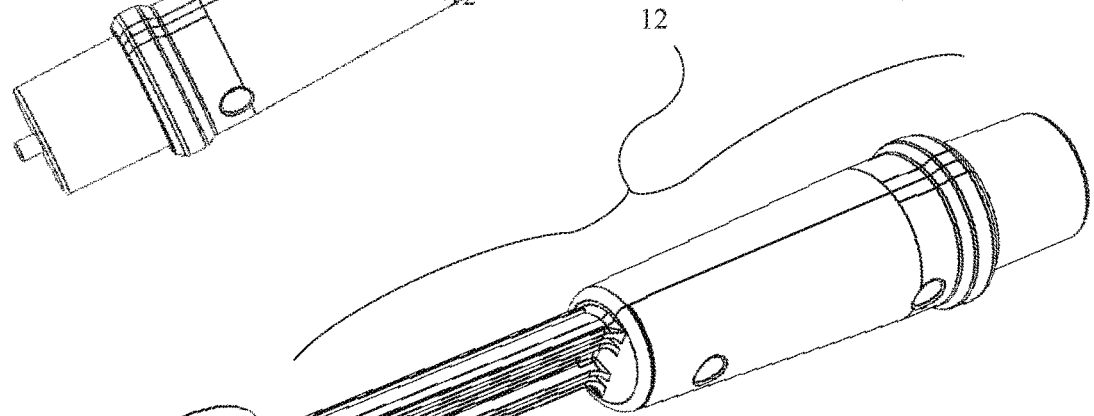
FIG. 3B shows another isometric view of an exemplary handle and scoop according to the invention.
Figure 3C:
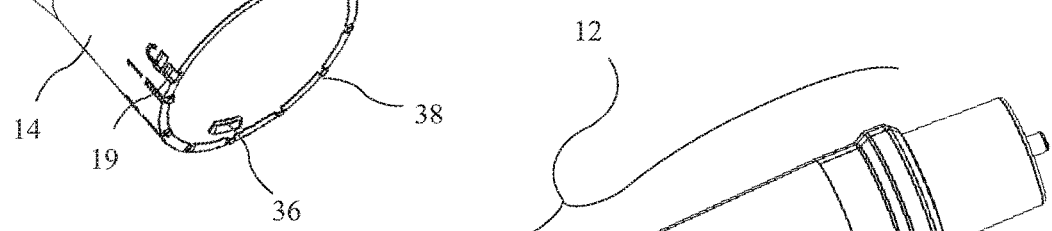
FIG. 3C shows another isometric view of an exemplary handle and scoop according to the invention.
Figure 3C:
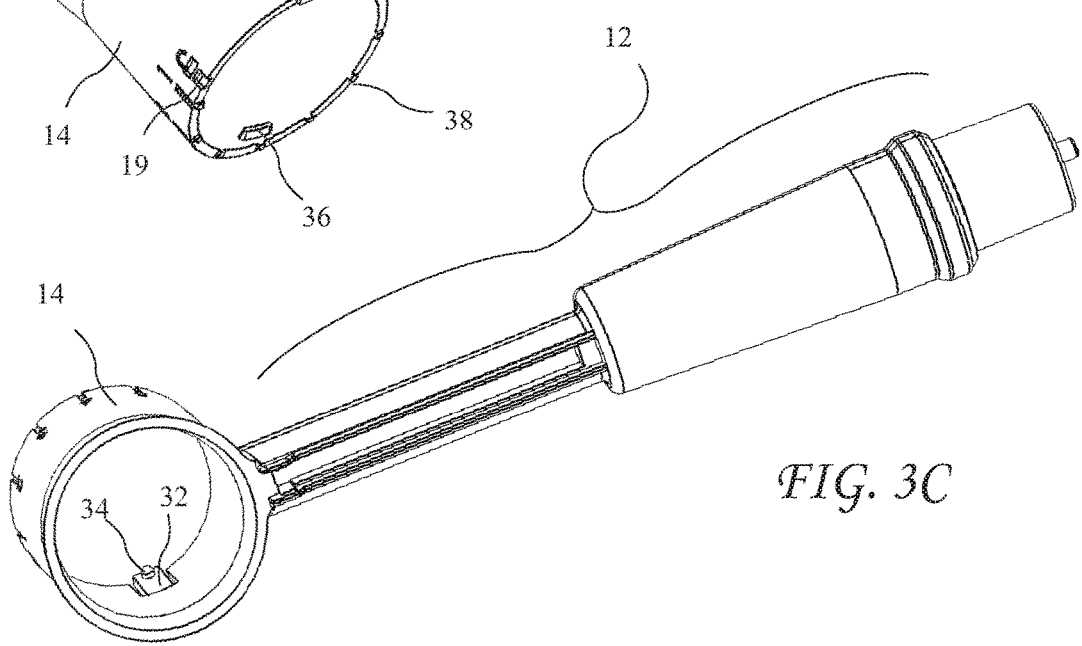

Referring to FIGS. 3A-C, the scoop body 14 includes a flap 32 formed in the sidewall at the bottom edge 38 of the scoop body 14. The flap 32 has a bump 34 extending inward toward the interior of the scoop body 14. The scoop body 14 also includes a tab 36 in the sidewall near the bottom edge 38. Referring to FIGS. 4A, 4B, 5A, 5B, the bump 34 engages a plunger groove 40 in the outer peripheral wall of the plunger 16. As shown, the plunge groove 40 winds around the outer periphery of the plunger 16 in a helical pattern at a pitch that provides the desired rate of advancement of the plunger 16 within the scoop body 14 when the plunger 16 is rotated. The tab 36 preferably extends angularly inward and also engages the plunger groove 40, and is tilted to match the pitch of the plunger groove 40.

The cooperation of the plunger groove 40 with the bump 34 and tab 36 thus translate rotation of plunger 16 in the cylindrical interior 15 of the scoop body 14 to vertical movement of the plunger 16 in the cylindrical interior 15 of the scoop body 14 to vary the volume of the scoop. Referring to FIGS. 4A, 4B, 5A and 5D, a detachment index 19 aligns with the pointer 20 when recesses 41 are aligned with the tab 36 and bump 34, allowing the plunger 16 to be removed from the scoop 14. Thus, the positions of the bump, 34, the tab 36, and the recesses 41 can vary, but the relative positions of these elements are preferably arranged to allow for detachment of the plunger 16 from the scoop body 14.

Referring to FIGS. 4A and B, the plunger 16 includes a pair of spiral grooves 40 circling the plunger 16, winding from a point on the outer wall of the plunger 16 and terminating in recesses 41 at the bottom edge 43 of the plunger 16. The plunger 16 is insertable into the cylindrical interior 15 of the scoop body 14 through the scoop mouth 26, aligning the recesses 41 with the bump 34 and tab 36 to engage the bump 34 and tab 36 with the spiral grooves 40. The plunger 16 is then rotated using a grip 44 in an end 48 of the plunger 16 to raise and lower the floor 17 to adjust the volume of the scoop. Teeth 42 in the grooves 40 cooperate with the bump 34 to provide stepped indexing. The depth of the plunger 16 in the scoop body 14 is indicated by the alignment of the pointer 20 with one of the index lines 18 on the scoop 14.

Referring to FIGS. 5A-D and 6, the plunger 16 includes an O-ring groove 46 receiving an O-ring 50, as shown in FIG. 7. The flexible O-ring provides a resilient seal between the plunger 16 and the inner sidewall of the scoop body 14 so that material does not leak out of the scoop or get lodged between the scoop body 14 and the plunger 16.

While the adjustable scooping device 10 is depicted as having a handle, the adjustable scoop can be provided according to the invention without such a handle, or with alternative means of grasping and steadying the scoop. The scoop 15 can be made from a transparent material, volume markings can be made visible through the transparent material to observe the volume setting of the adjustable scoop.

Thus, in general the adjustable scoop includes a scoop body and a plunger. The scoop body has a cylindrical interior sidewall, a hollow interior, an open top, and an open bottom. The interior is hollow to accommodate the plunger, the top is open so that material can be scooped through the top, and the bottom is open so that the plunger can be accessed to rotate the plunger. The interior sidewall should be cylindrical, that is, be round and have parallel sides, so that the plunger can be rotated within the scoop body and can also move longitudinally within the scoop body while maintaining close contact with the inner sidewall. The outer surface of the scoop body need not be cylindrical, however, and can be, for example, ornamental. Preferably, the plunger is cylindrical, having an outer wall corresponding to the cylindrical interior sidewall of the scoop body.

The plunger is configured to be arranged in the hollow interior of the scoop body such that a top surface of the plunger faces the open top of the scoop body. Thus, when the plunger is arranged within the scoop body and the outer wall of the plunger maintains close contact with the inner sidewall of the scoop body, a top surface of the plunger serves as an inner floor of the scoop. A volume of the hollow interior of the scoop body above the top surface of the plunger therefore defines a volume of the adjustable scoop. It is this volume that is selectably adjustable to determine the amount of material to be measured by the scoop.

The plunger is rotatable in the hollow interior of the scoop body to adjust a distance between the top surface of the plunger and the open top of the scoop body, thereby adjusting the volume of the adjustable scoop. Rotation of the plunger in a first direction moves the plunger closer to the open top of the scoop body, thereby reducing the volume of the scoop. Likewise, rotation of the plunger in the other direction moves the plunger away from the open top of the scoop body, thereby increasing the volume of the scoop. The plunger engages the scoop body in such a way as to translate rotation of the plunger into forward and backward motion of the plunger within the scoop body interior.

To this end, the plunger includes a first engagement element, and a surface of the interior sidewall of the scoop body includes a second engagement element extending from the surface of the interior sidewall. The first and second engagement elements are configured to mutually cooperate to translate rotation of the plunger in the hollow interior of the scoop body to adjustment of the distance between the top surface of the plunger and the open top of the scoop body. In order to accurately measure and dispense material using the scoop, to allow for moving close contact between the plunger and the inner sidewall of the scoop body, and to facilitate cleaning of the scoop, it is preferable that the interior surface of the scoop does not have any aberrations in its surface, such as elements that extend or recess from the parallel sidewall surface within the scoop volume. Therefore, it is preferable that the surface of the interior sidewall of the scoop body is smooth and continuous with the exception of the second engagement element. It is also preferable that the second engagement element extend from the surface of the interior sidewall to engage the first engagement element only outside the scoop volume. A seal can be provided at the contact point between the plunger and the scoop body to further encourage close contact between these elements. For example, a resilient O-ring or other gasket-type element can be arranged between the plunger and the scoop body. In this case, the outer wall of the plunger can include a groove, preferably an annular groove, in which the O-ring can be seated.

The plunger can include a grip that is graspable to rotate the plunger in the scoop body. For example, the bottom surface of the plunger can be recessed with the exception of a raised segment, knob, or bar that can be grasped by a user to facilitate rotating the plunger. Alternatively, the segment, knob, or bar can be raised to extend beyond a flat bottom surface of the plunger, or the bottom surface of the plunger can be knurled or otherwise textured to facilitate rotation of the plunger by the user. Any structural feature of the plunger that can facilitate rotation of the plunger by the user is contemplated as a feature of the invention.

The adjustable scoop can also include a handle attached to the scoop body. For example, the handle can have a grasping end and a scoop end. The scoop body can be attached to the scoop end of the handle. Alternatively, the handle can be attached to a bottom surface or end of the plunger. In this case, the scoop body can be rotated while the handle is held stationary in order to adjust the volume of the scoop.

The adjustable scoop can also include a leveling element that can be used to level heaped material gathered in the scoop volume, so as to provide a reliable amount of measured scooped material. The leveling element includes a leveling arm that is slidably coupled to the handle so as to be movable by the user, and a leveling bar attached to the leveling arm that is slidable across the open top of the scoop body in order to pushed away material that is heaped above the open top, leaving only a level measured amount of material within the scoop volume. The leveling arm can be retractable, and can be biased in either direction so as to provide a default position for the leveling element, and a locking mechanism can be provided to keep the leveling element in place when not in use. The arrangement of the leveling element allows for single-handed operation for scooping, leveling, and dispensing.

The engagement elements can take any form, so long as they can cooperate to provide the translated motion described herein. For example, the first engagement element can be a spiral groove formed in the outer wall of the plunger, and the second engagement element can extend to engage the spiral groove. The second engagement element can take any form, and can, for example, include a flap formed at the open bottom of the scoop body, and a bump formed on the flap. The bump, extending from the flap and therefore from the inner surface of the sidewall of the scoop body, engages the spiral groove of the plunger. As the plunger rotates, the bump moves along the spiral groove and therefore the scoop body moves longitudinally up or down as the plunger rotates.

The plunger can also include a plurality of teeth or other projections arranged in the spiral groove and raised to an extent so as to provide resistance to movement of the bump over the teeth, and the flap provides sufficient flexibility to allow movement of the bump over the teeth. That is, when as the plunger rotates, the bump eventually encounters one of the teeth, which is raised enough that the bump abuts the tooth to hinder further rotation of the plunger. However, the flexible nature of the flap allows it to resiliently move to an extent that the bump passes over the tooth, allowing for further rotation of the plunger. To facilitate movement of the bump over the tooth, the bump preferably has a rounded surface. Of course, rounded bumps can be arranged in the spiral groove and a tooth can be arranged on the flap as an alternative arrangement.

The scoop body can include a plurality of index lines marked at spaced intervals, and the plunger can include a pointer that aligns generally with a selected one of the index lines as the plunger is rotated in the hollow interior of the scoop body. Thus, each index line can correspond to the volume of the scoop achieved when the pointer aligns with that index line. Markings can be made on the scoop body to indicate the volume of the scoop corresponding to each index line when aligned with the pointer. If the spiral groove does not include teeth or other projections, the rotation of the plunger and therefore the volume of the scoop can be continuously variable, allowing for fine adjustment of the volume. If the spiral groove does include the teeth, locations of the index lines can correspond to locations of the teeth, which can provide reliable stops for pre-selected volume amounts. The spiral groove can terminate at one end at a bottom edge of the plunger, providing an indentation at the bottom edge that allows the plunger to pass completely over the bump to facilitate removal of the plunger from the interior of the scoop body.

Rather than just a single spiral groove, the first engagement element can instead be multiple spiral grooves, such as two spiral grooves formed in the outer wall of the plunger. In this case, the second engagement element can include two flaps with bumps as described above. Alternatively, the second engagement element can include a flap formed at the open bottom of the scoop body, a bump formed on the flap, and a tab extending from the interior sidewall of the scoop body. In this arrangement, bump can be configured to engage the first spiral groove, and the tab can be configured to engage the second spiral groove, and the bump can provide indexing as described above while the tab maintains stability of the plunger within the scoop body. Therefore, if the first engagement element includes teeth in a spiral groove as described above, only one groove need include the teeth if the bump-and-tab arrangement is used. Both grooves can include the teeth, however. The flap can be arranged, for example, generally opposite the tab, so that the opposing bump and tab maintain the position of the plunger. Both the first and second spiral grooves can terminate at one end at a bottom edge of the plunger, to facilitate removal of the plunger from the scoop body.

The invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. An adjustable scooping device, comprising:
   scoop body means for enclosing scooped material within a hollow interior, having a cylindrical interior sidewall, an open top, and an open bottom; and
   plunger means for rotating in the hollow interior of the scoop body means to adjust a working volume of the adjustable scooping device, arranged in the hollow interior of the scoop body means such that a top surface of the plunger means faces the open top of the scoop body means;
   wherein a volume of the hollow interior of the scoop body means above the top surface of the plunger means defines the working volume of the adjustable scooping device;
   wherein the adjustable scooping device further includes first and second engagement means for mutual cooperation to translate rotation of the plunger means in the hollow interior of the scoop body means to adjustment of the distance between the top surface of the plunger means and the open top of the scoop body means;
   wherein the plunger means includes the first engagement means, and a surface of the interior sidewall of the scoop body means includes the second engagement means extending from the surface of the interior sidewall;
   wherein the surface of the interior sidewall of the scoop body means is smooth and continuous with the exception of the second engagement means; and
   wherein an outer surface of the plunger means includes an indentation configured to retain sealing means for providing a sealing surface between the outer surface of the plunger means and the surface of the interior sidewall of the scoop body means.

2. The adjustable scooping device of claim 1, further comprising handle means for holding the adjustable scooping device, having a grasping end and a scoop end, wherein the scoop body means is attached to the scoop end of the handle means.

3. The adjustable scooping device of claim 2, further comprising leveling means for leveling contents of the adjustable scooping device, including extension means for sliding along the handle means, and push means coupled to the extension means for sliding across the open top of the scoop body means.

4. The adjustable scooping device of claim 1, wherein the plunger means includes grip means for grasping to rotate the plunger means in the scoop body means.

5. The adjustable scooping device of claim 1, wherein the plunger means is cylindrical, having an outer wall corresponding to the cylindrical interior sidewall of the scoop body means.

6. An adjustable scooping device, comprising:
   a scoop body having a cylindrical interior sidewall, a hollow interior, an open top, and an open bottom; and
   a plunger configured to be arranged in the hollow interior of the scoop body such that a top surface of the plunger faces the open top of the scoop body;
   wherein a volume of the hollow interior of the scoop body above the top surface of the plunger defines a volume of the adjustable scoop;
   wherein the plunger is rotatable in the hollow interior of the scoop body to adjust a distance between the top surface of the plunger and the open top of the scoop body, thereby adjusting the volume of the adjustable scoop;
   wherein the plunger includes a first engagement element, and a surface of the interior sidewall of the scoop body includes a second engagement element extending from the surface of the interior sidewall;
   wherein the first and second engagement elements are configured to mutually cooperate to translate rotation of the plunger in the hollow interior of the scoop body to adjustment of the distance between the top surface of the plunger and the open top of the scoop body;
   wherein the surface of the interior sidewall of the scoop body is smooth and continuous with the exception of the second engagement element;
   wherein the scoop body includes a plurality of index lines marked at spaced intervals; and
   wherein the plunger includes a pointer that aligns generally with a selected one of the index lines as the plunger is rotated in the hollow interior of the scoop body.

7. The adjustable scooping device of claim 6, wherein locations of the index lines correspond to locations of features of the first engagement element.

8. The adjustable scooping device of claim 6, wherein the pointer is arranged on a bottom surface of the plunger.

9. The adjustable scooping device of claim 8, wherein the pointer is arranged at a peripheral edge of the bottom surface of the plunger.

10. The adjustable scooping device of claim 6, wherein the index lines are spaced in sequence around an outer circumference of the scoop body.

11. The adjustable scooping device of claim 10, wherein the pointer is configured to follow a path around the outer circumference of the scoop body as the distance between the top surface of the plunger and the open top of the scoop body is adjusted.

12. The adjustable scooping device of claim 6, further comprising a handle having a grasping end and a scoop end, wherein the scoop body is attached to the scoop end of the handle.

13. The adjustable scooping device of claim 12, further comprising a leveling element, wherein the leveling element includes a leveling arm that is slidably coupled to the handle, and a leveling bar slidable across the open top of the scoop body.

14. The adjustable scooping device of claim 6, wherein the plunger includes a grip that is graspable to rotate the plunger in the scoop body.

15. The adjustable scooping device of claim 6, wherein the first engagement element is a spiral groove formed in the outer wall of the plunger.

16. The adjustable scooping device of claim 15, wherein the second engagement element includes a flap formed at the open bottom of the scoop body, and a bump formed on the flap.

17. The adjustable scooping device of claim 16, wherein the plunger further includes a plurality of teeth arranged in the spiral groove and raised to an extent so as to provide resistance to movement of the bump over the teeth, and the flap provides sufficient flexibility to allow movement of the bump over the teeth.

18. The adjustable scooping device of claim 17, wherein the plunger includes a pointer that aligns generally with a selected one of the index lines as the plunger is rotated in the hollow interior of the scoop body.

19. The adjustable scooping device of claim 18, wherein locations of the index lines correspond to locations of the teeth.

20. The adjustable scooping device of claim 15, wherein the spiral groove terminates at one end at a bottom edge of the plunger.

* * * * *